(12) United States Patent
Palekar

(10) Patent No.: US 8,856,481 B1
(45) Date of Patent: Oct. 7, 2014

(54) DATA PROCESSING SYSTEM HAVING HOST-CONTROLLED PROVISIONING OF DATA STORAGE RESOURCES

(75) Inventor: Ashish Palekar, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 1414 days.

(21) Appl. No.: 12/561,367

(22) Filed: Sep. 17, 2009

(51) Int. Cl.
*G06F 12/00* (2006.01)

(52) U.S. Cl.
USPC .................................. 711/170; 711/E12.002

(58) Field of Classification Search
USPC .......................................... 711/170, E12.002
See application file for complete search history.

(56) References Cited

U.S. PATENT DOCUMENTS

| | | | | |
|---|---|---|---|---|
| 6,088,777 | A * | 7/2000 | Sorber | 711/171 |
| 6,363,468 | B1 * | 3/2002 | Allison | 711/173 |
| 6,883,065 | B1 * | 4/2005 | Pittelkow et al. | 711/114 |
| 7,657,613 | B1 * | 2/2010 | Hanson et al. | 709/220 |
| 2005/0193231 | A1 * | 9/2005 | Scheuren | 714/5 |
| 2006/0206682 | A1 * | 9/2006 | Manbert et al. | 711/170 |
| 2008/0059744 | A1 * | 3/2008 | Ozaki et al. | 711/165 |
| 2008/0120459 | A1 * | 5/2008 | Kaneda et al. | 711/112 |
| 2008/0229045 | A1 * | 9/2008 | Qi | 711/170 |
| 2010/0299495 | A1 * | 11/2010 | Frank | 711/170 |

OTHER PUBLICATIONS

King, "LUN Masking in SAN," retrieved from http://www.filibeto.org/sun/lib/nonsun/qlogic/wp/whitepaper.lunmasking.pdf, Oct. 8, 2001.

* cited by examiner

*Primary Examiner* — Aracelis Ruiz
(74) *Attorney, Agent, or Firm* — BainwoodHuang

(57) ABSTRACT

A data processing system includes a host computer that executes a storage-aware component which (1) dynamically determines a need of the host computer for data storage resources of a necessary size and a necessary class, and (2) generates a storage allocation request message representing a request by the host computer that data storage resources of the necessary size and the necessary class be allocated to the host computer. The necessary class is one of a set of classes of a predetermined class-of-storage (CoS) scheme by which storage resources in the data processing system are classified. The details and complexity of the CoS scheme may vary from system to system. A data storage system communicatively coupled to the host computer includes available data storage resources of at least the necessary size and the necessary class which can be allocated for use by the host computer. The data storage system is operative to (1) receive the storage allocation request message from the host computer, and (2) in response to the storage allocation request message, allocate data storage resources of the necessary size and the necessary class from the available data storage resources to the host computer.

8 Claims, 2 Drawing Sheets

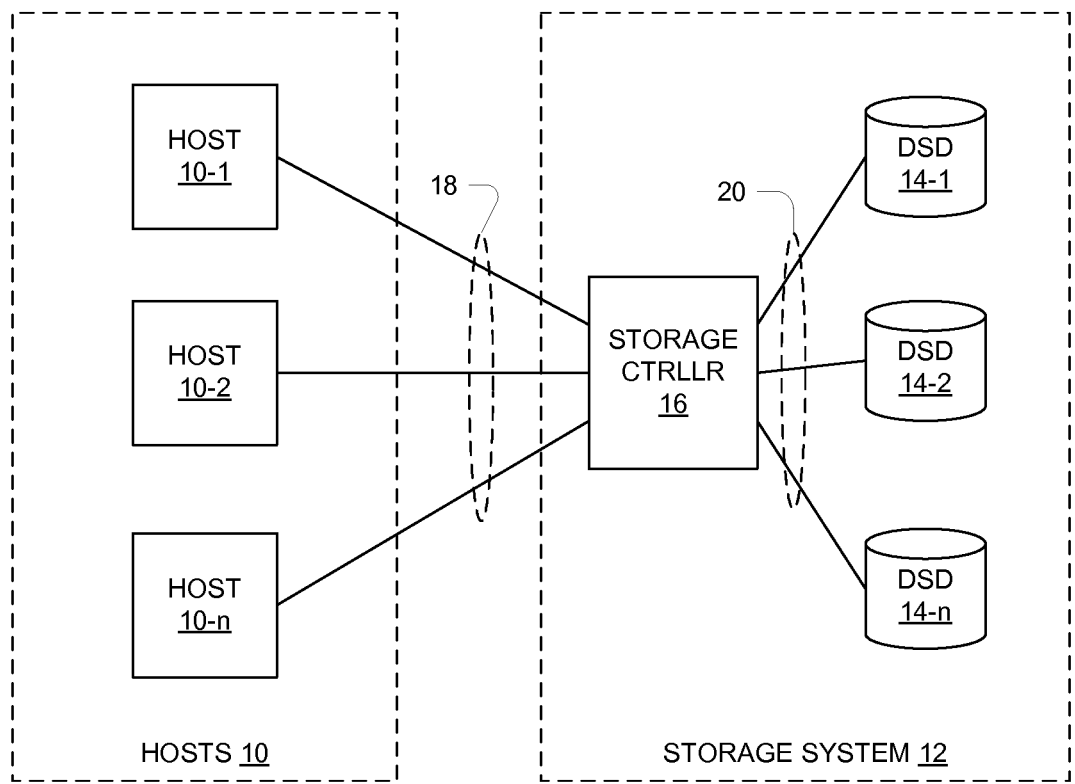
Fig. 1
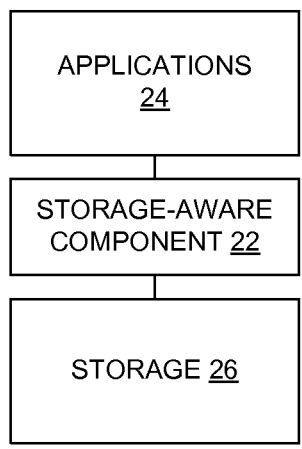 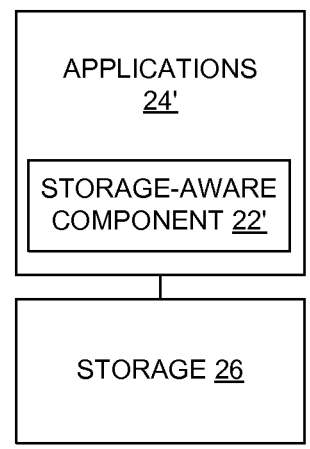
Fig. 2                    Fig. 3

DATA PROCESSING SYSTEM HAVING HOST-CONTROLLED PROVISIONING OF DATA STORAGE RESOURCES

BACKGROUND

The present invention relates to the field of data processing systems, and in particular to the allocation of data storage resources for use by host computers in data processing systems.

It has been known to provide for selective allocation of data storage resources for use by different host computers in data processing systems. As one example, a technique known as "LUN masking" has been used by which the physical storage capacity of a data storage device is divided into smaller sections referred to as "logical units" or LUNs. LUNs are assigned to different hosts by a storage system administrator having a control channel into the data storage device. When a host scans the data storage device for available LUNs, only those LUNs which have been assigned to the host are revealed as available for use by the host. The host subsequently builds internal representations of the assigned LUNs and generates storage requests (reads, writes) which are directed to the assigned LUNs.

SUMMARY

Existing storage allocation techniques are essentially manual operations requiring action by a human storage administrator, who is responsible for provisioning storage based on an understanding of the storage requirements of the host computers of a data processing system. Both the manual aspect as well as the reliance on the administrator's knowledge of host requirements may lead to inefficiencies in storage allocation that may deleteriously affect system performance.

The presently disclosure is directed to techniques for more automated provisioning of data storage resources, for example by enabling a host computer to directly communicate its storage needs to a data storage system which can allocate storage resources accordingly. The inefficiencies associated with existing manual provisioning techniques may be avoided or reduced. Additionally, the disclosed techniques involve an explicit "class of storage" classification scheme to enable host computers to both identify the types or classes of storage available for use as well as to specify such types/classes in allocation requests. Overall, the disclosed techniques promote intelligent host-based storage provisioning which can improve administration and performance of data processing systems.

Broadly, a disclosed data processing system includes a host computer that executes a storage-aware component which (1) dynamically determines a need of the host computer for data storage resources of a necessary size and a necessary class, and (2) generates a storage allocation request message representing a request by the host computer that data storage resources of the necessary size and the necessary class be allocated to the host computer. The necessary class is one of a set of classes of a predetermined class-of-storage (CoS) scheme by which storage resources in the data processing system are classified. The details and complexity of the CoS scheme may vary from system to system.

A data storage system communicatively coupled to the host computer includes available data storage resources of at least the necessary size and the necessary class which can be allocated for use by the host computer. The data storage system is operative to (1) receive the storage allocation request message from the host computer, and (2) in response to the storage allocation request message, allocate data storage resources of the necessary size and the necessary class from the available data storage resources to the host computer.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 is a block diagram of a data processing system;

FIG. 2 and FIG. 3 are schematic depictions of organizations of host computers containing storage-aware components providing storage allocation functionality;

DETAILED DESCRIPTION

Figure 4:
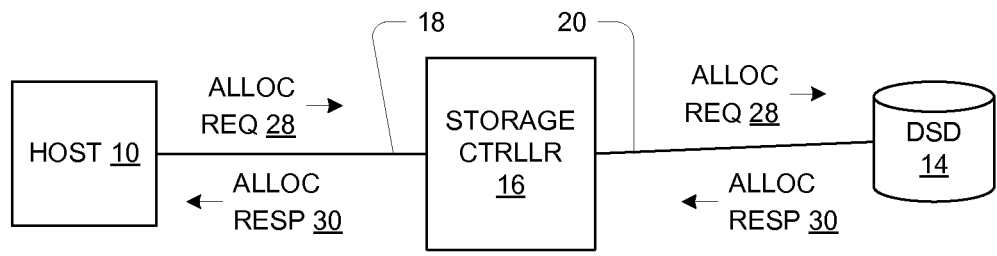
FIG. 4 is a block diagram showing a flow of in-band storage allocation request and response messages.

FIG. 1 shows a data processing system including a set of host computers (hosts) 10 and a data storage system (storage system) 12. In the illustrated embodiment the data storage system 12 is shown as including a set of data storage devices (DSDs) 14 and a storage controller 16. The hosts 10 are communicatively coupled to the storage controller 16 by first communication links 18, and the storage controller 16 is communicatively coupled to the DSDs 14 by second communication links 20.

The hosts 10 are typically server-style computers having one or more processors, memory, local storage and input/output interface circuitry connected together by one or more data buses, configured to execute software programs as generally known in the art. Additional details on specific aspects of the hosts 10 are provided below.

The storage controller 16 is a hardware device specifically tailored to provide high-bandwidth data transfer between the hosts 10 and the DSDs 14, and thus typically includes sets of high-speed communication interfaces (e.g., GbE or Fibrechannel) coupled together by a set of high-speed configurable data paths often referred to as a "fabric". The storage controller 16 also includes processing circuitry for implementing higher-level functions including so-called storage virtualization, by which the hosts 10 are presented with storage volumes that are logical entities that are mapped to physical storage resources provided by the DSDs 14. Additional details are provided below.

The DSDs 14 are hardware devices which contain physical nonvolatile storage hardware (e.g., magnetic disks or flash memory arrays, and also referred to as "storage resources") as well as logic/circuitry for accepting data for storage and providing stored data to an external requestor. A given DSD 14 may also be referred to as an "array" herein. In one example, a DSD 14 includes an array of magnetic disks (e.g., twelve disks) as well as a local array controller that coordinates external access to the disks. The local array controller may be a RAID controller, for example, realizing RAID volumes using the local disks. A given DSD 14 may include only one type of storage device, such as a magnetic disk type having certain operating characteristics, although some DSDs 14 may contain a mix of different-type storage devices/resources. It is assumed herein that different types of storage resources will generally be found among the different DSDs 14-1, 14-2 etc. For example one DSD 14-1 may be a very high-performance storage system referred to as a integrated cached disk array (ICDA), such as sold under the name Symmetrix® by EMC Corporation, while another DSD 14-2 may be a lower-performance disk array or even a device tailored for long-term backup of data rather than for on-line use.

More generally, the storage system 12 provides storage resources according to a predefined "class of storage" (CoS) classification scheme. Different types of CoS schemes may be used in different embodiments. Generally, any of various criteria may be used to distinguish among classes in any particular CoS scheme. Pertinent criteria include the following:

1. Latency—time from request to completion of a storage operation (e.g., return of read data or write completed)
2. Availability—ability to provide continual service even in event of component failure
3. Capacity—data storage capacity, measured in gigabytes for example
4. I/Os per second—rate at which storage requests can be processed
5. MB per second—rate of data transfer Any particular CoS scheme will include two or more types or ranges for each of the criteria utilized in the scheme. For example, a scheme might simply distinguish between "high" and "low" for one or more criteria, i.e., in the category of "latency" there might be a "high latency" and a "low latency" type, where "high" and "low" would typically map to ranges of specific time values of latency. Other schemes might use more ranges or types as necessary.

It will be appreciated that at the level of the DSDs 14, it may be fairly easy to determine how the storage provided by a given type of DSD 14 fits into a particular CoS scheme. For example, if it is known that a particular DSD 14 is a large ICDA as opposed to a smaller non-cached storage device, then its characteristics of latency, availability, etc. may be sufficiently known for purposes of CoS classification. However, the presence of virtualization as provided by the storage controller 16 may complicate matters. One important hallmark of virtualization is the hiding of hardware details and presenting generic-looking volumes to a host 10. The different volumes defined and presented by the storage controller 16 are realized by underlying physical storage resources provided by the DSDs 14. If two volumes map to different DSDs 14 of different CoS classes, then it is desirable that the volumes themselves reflect the CoS distinction as well. The techniques described herein facilitate such identification of CoS class information of virtualized storage resources.

The technique disclosed herein is directed to intelligent host-based provisioning of storage for application programs (or "applications"). This is in contrast to conventional provisioning schemes which generally involve a storage system administrator who performs storage provisioning using an administrative channel or interface into the DSDs 14 or storage controller 16. In such conventional schemes, the storage system administrator has an understanding of which applications are being executed on the hosts and exercises judgment regarding how much and what type of storage resources should be allocated to the hosts on the basis of that understanding. In the disclosed technique, the hosts 10 are more directly responsible for storage provisioning, which promotes both (1) a better matching between the allocation of storage resources and the actual needs of applications running on the hosts 10, and (2) a more automated process performed directly between the hosts 10 and the storage system 12, avoiding the delays and other drawbacks of a separate storage system administrator for example.

FIGS. 2 and 3 show one aspect of the disclosed technique, which is the use of certain logic shown as a storage-aware component 22 in connection with applications 24 and storage 26, where it is understood that the applications 24 are application programs running on the hosts 10 and the storage 26 represents both the storage system 12 as well as storage-related functions within the hosts 10 (such as device drivers, communications interfaces, etc.). The storage-aware component 22 (which will typically employ software executed by the host 10) performs certain functions related to host-based storage provisioning as more fully described below. In FIG. 2 it is assumed that the storage-aware component 22 is separate from the applications 24. Such an arrangement may be useful when the storage-aware component 22 is deployed in a system in which one or more applications 24 do not support the host-based provisioning techniques described herein (this may be seen as a "backwards compatible" deployment). FIG. 3 shows an alternative type of system in which the storage-aware component 22' is included within the applications 24', making the applications 24' themselves capable of performing certain host provisioning functions as described herein.

Figure 5:
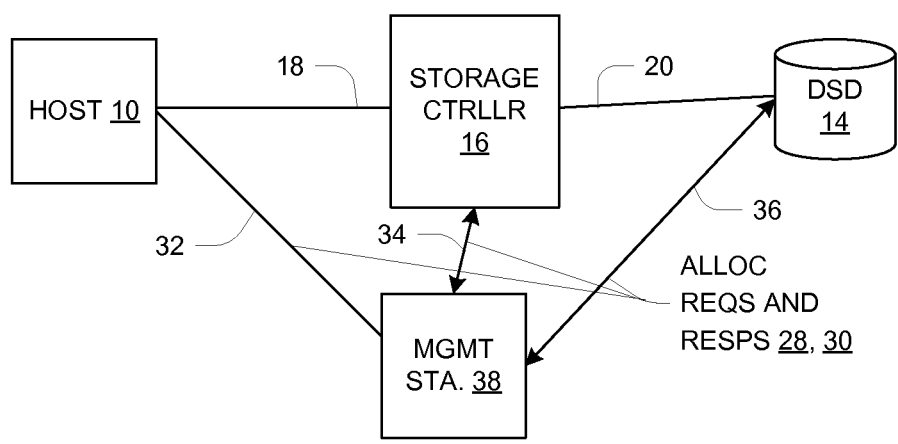
FIG. 5 is a block diagram showing a flow of out-of-band storage allocation request and response messages.

FIGS. 4 and 5 illustrate alternative arrangements which support host-based provisioning as described herein. FIG. 4 shows what might be termed an "in-band" arrangement in which allocation request messages (or requests) 28 and allocation response messages (or responses) 30 are carried on the same communication links 18 and 20 that carry storage requests and responses including the accompanying read and write data. FIG. 5 shows an "out-of-band" arrangement in which the allocation requests and responses 28, 30 are carried on separate communications links 32, 34 and 36 and involve operation of a storage management station 38.

Three aspects of host-based provisioning are described herein. These include (1) the ability of a host 10 to determine the class of storage for a given volume (also referred to as "LUN" herein); (2) allowing a host 10 to request the allocation of LUNs to the host; and (3) the direct provisioning of storage by applications 24 or 24' (collectively applications 24). These aspects are described below. In addition, an extension is also described which enables intelligent host-based provisioning to work for clustered setups.

1. Determining the Storage Class of Storage (CoS) for a Given LUN

The nature of storage is understood in terms of its deployment. This understanding is utilized to distribute storage amongst various applications. For example, an application that is seen as "mission critical" (central to the delivery of an important service) may require use of storage that is classified as "tier 1" (having highest performance and reliability characteristics of all storage resources available in a system). However, in current systems there is no mechanism defined to transmit CoS information to an application.

The following are examples of techniques by which a host can to determine the CoS for a given LUN (which include four in-band and one out-of-band as indicated):

a. Use the data returned from an existing command to determine CoS (e.g., any LUN that returns a product identifier of an ICDA type of DSD could be determined to have a Tier 1 CoS) (in-band).

b. Use application-specific tests to determine the CoS for a device (e.g., measure data rates, capacity, number of distinct paths to the DSD, etc.) (in-band).

c. Define a vendor unique command that can be used to query the storage (in-band)

d. Define a vendor unique field in an existing command (e.g., a field of a SCSI INQUIRY command) that will allow querying the host/storage application (in-band)

e. Allow the host to query a server which hosts CoS information of DSDs in a system For (c), (d) and (e) above, a storage application can determine its CoS in one of the following ways:

a. The storage administrator can hard-code this information into the array (one-time operation)

b. Determine the nature of the media it has access to

While determining the CoS may be trivial for devices such as ICDAs and others in which all LUNs have the same CoS, the same is not true for devices utilizing virtualization such as a virtualizing storage controller, which can present LUNs with differing CoS. In fact, in some architectures, depending on how CoS is determined, it may even be possible for the CoS for a given LUN to change over time (e.g., if the number of paths is used as a determining factor for CoS and the storage loses access to several paths to its media, it may choose to downgrade the CoS for storage virtualized from that media). Additionally, a mechanism for determining CoS can enable applications to determine whether the storage that is available to them is appropriate for their usage. It can also allow an application to trigger a message to an application administrator when CoS of storage allocated to the application has changed in a way that might be problematic, thereby giving an automated early detection system to the application administrators.

Host interrogating of COS is a mechanism that may be used in conjunction with host allocation of LUNs as described below.

2. Allowing a Host to Allocate LUNs to Itself

The model of storage allocation followed by administrators today is to first divide available storage into LUNs, and then use array specific mechanisms to "mask" LUNs to the appropriate hosts. Applications scan for LUNs before being able to use them. The primary benefits of this approach are security—in terms of limiting access. Furthermore, the storage administrators are responsible for provisioning LUNs to the storage based on their implicit understanding of CoS. The downsides of this approach are that the process is manual and involves decision making from different administrators. The process becomes even more complex for devices that virtualize storage. Provisioning storage in system using virtualizing storage controllers may require involvement of three separate administrators (for the hosts, controller and DSDs respectively).

In the presently disclosed approach, a host 10 communicates its requirement for a LUN directly to the storage system 12. This requirement can be communicated either in-band or out-of-band. In order to achieve in-band communication, which in many instances may be preferred, the information can be communicated via a vendor-unique command that specifies both a size and a CoS of a LUN that is required. In response, a component of the storage system 12 such as the storage controller 18 or a DSD 14 determines if the requesting host is trusted and authorized to request such an allocation of storage. Note that this same method can also be used to allow a host 10 to request an increase in the size of a LUN that may be already allocated to the host. The storage system 12 can then make a determination of whether it has the capability to provide the requested storage capacity (i.e. the necessary size and CoS) and attempts to meet the request. If successful, the requested allocation is made and the availability of the LUN is communicated via a successful response to the request. It may be possible to modify existing in-band commands in order to meet this requirement. The out-of-band approach is also an option but it would need an additional agent on the host 10 as well as in the storage system 12.

For a virtualizing intermediate device such as a virtualizing storage controller 16, host requesting of storage has two pertinent implications, one being the ability to support the request on the front end (i.e., host-facing interface) where it accepts such requests from a host 10 and also on the back-end (DSD-facing interface) where it needs to be able to make provisioning requests to the DSDs 14. The host-side infrastructure can be provided as part of existing storage management mechanisms or application, including for example an application known as PowerPath provided by EMC Corporation. It would be desirable to provide the ability to provision storage at three levels—host 10, network (i.e. at controllers 16), and DSD 14. Over time, this ability may have many interesting implications—for example, the technique may enable a host to specify creation of LUN from a specific backend, host-based thin provisioning etc. The use of this method does not prevent the existing approach of using administrator-provisioned storage. However, one benefit of this approach is that it can potentially minimize configuration-related issues.

3. Direct Application Provisioning of Storage

According to this aspect of the present disclosure, the applications 24' include the storage-aware component 22' and are capable of both dynamically determining their own storage needs as well as taking steps to obtain storage resources of desired amounts and CoS class(es) as necessary for operation. There may be configurable control over this aspect of application behavior. For example, when an application 24' is installed or instantiated on a given host 10, it may execute a "provisioning wizard" as a tool to obtain information from an administrator about the amount and type of storage resources the application needs (CoS, size, number of devices, static/dynamic allocation, etc). Note this can either be manually queried or part of an application specification automatically. This enables storage to be provisioned automatically based on the needs of the application 24'. The application 24' can choose to extend the storage resources available to it or choose to free up resources based on usage patterns. Thus, the allocation of storage to applications 24' can be optimized by the applications 24' themselves. As an example, a file system application can monitor its usage of storage resources and detect when it has crossed some predefined high watermark in terms of usage, and then immediately summon the provisioning wizard to allocate more storage which will implement the request through the host-based requesting and interrogating described above. Note that this method of allocating storage is completely independent of the type of DSD 14 providing storage resources to the application. Thus, the application is not tied to any specific method of storage allocation. Thus, while request and interrogating functions as generally outlined above may be used, this approach to allocate storage is independent of any specific methods used to implement those functions. In addition, this method can be used as a supplement to the current method which uses statically pre-allocated storage in order to provision an application right at its instantiation.

It is noted that the devices 12, 14 of a storage system may provide storage resources to a multitude of applications 24', and in many cases the applications 24' have the best knowledge of their own storage requirements. Thus it makes sense to enable the applications 24' to communicate storage requirements to the storage system 12. This approach can make the allocation of storage on DSDs 14 policy-based and dynamic, rather than the current process that involves static pre-allocation by a cadre of administrators.

4. Extension to Clusters

The host-based requesting of storage resources can be extended for use in "clustered" computing environments in which a set of hosts coordinate their workload in accordance with some shared plan. The requirements for a clustered setup are different in that the LUNs have to be shared by all the hosts functioning as part of the cluster. This requirement can be achieved by:

a. The hosts individually provisioning the storage. This implies that the cluster protocol should include an additional provisioning step at the time of initializing the cluster. For example, a master host of the cluster may need to communicate the LUNs it has provisioned to other nodes in the cluster.

b. The non-master hosts may communicate their storage needs to the master host which may provision storage for all cluster hosts in one or more operations.

The second approach (b) may be more efficient than the first approach (a), although the approach (a) may be more modular.

While various embodiments of the invention have been particularly shown and described, it will be understood by those skilled in the art that various changes in form and details may be made therein without departing from the spirit and scope of the invention as defined by the appended claims.

What is claimed is:

1. A storage controller for use in a data processing system, comprising a plurality of high-speed communication interfaces coupled together by a set of high-speed configurable data paths, the high-speed communications interfaces including (1) at least one host-facing interface coupled to one or more host computers, and (2) at least one storage-facing interface coupled to one or more data storage devices including physical data storage resources, the storage controller further including processing circuitry for implementing a storage virtualization function by which the storage controller presents storage volumes to the hosts using the physical data storage resources of the data storage devices, the processing circuitry being further operative to effect host provisioning of storage by:

receiving a first storage allocation request message from one of the host computers, the first storage allocation request message representing a request by the one host computer that data storage resources of a necessary size and a necessary class be allocated to the one host computer, the necessary class being one of a plurality of classes of a predetermined class-of-storage scheme by which storage resources in the data processing system are classified; and in response to the first storage allocation request message:

(A) generate a second storage allocation request message representing a request by the storage controller that data storage resources of the necessary size and the necessary class be allocated to the storage controller;

(B) transmit the second storage allocation request message to one of the data storage devices which includes available data storage resources and is operative to allocate data storage resources of the necessary size and the necessary class from the available data storage resources to the storage controller in response to the second storage allocation request message; and (C) reflecting the allocation of data storage resources by the one data storage device as a corresponding allocation of virtualized data storage resources of the necessary size and the necessary class presented to the one host computer, and prior to receiving and responding to the first storage allocation request message, providing class-of-storage information about the predetermined class-of-storage scheme to the one host computer by (i) receiving query messages from the one host computer, each query message representing a class-of-storage (CoS) request for the class-of-storage information, and (ii) providing the class-of-storage information to the one host computer in response to the CoS request for use by the host computer in generating the first storage allocation request message.

2. A storage controller according to claim 1, wherein:
the storage allocation request message is an in-band message received by the storage controller via a communications path between the one host computer and the storage controller that is also used for transferring storage request messages and corresponding storage data between the one host computer and the storage controller.

3. A data processing system, comprising:
the storage controller of claim 1; and
a data storage system including the storage controller and the data storage devices;
wherein the one host computer is operative to execute a storage-aware component to (1) dynamically determine a need of the one host computer for data storage resources of a necessary size and a necessary class, the necessary class being one of a plurality of classes of a predetermined class- of-storage scheme by which storage resources in the data processing system are classified, and (2) generate a storage allocation request message representing a request by the one host computer that data storage resources of the necessary size and the necessary class be allocated to the one host computer; and
wherein the data storage system is communicatively coupled to the one host computer and includes available data storage resources of at least the necessary size and the necessary class which can be allocated for use by the one host computer.

4. A data processing system according to claim 3, wherein:
the one host computer executes one or more application programs, and the determining of the need for data storage resources and the generating of the storage allocation request are done on behalf of and for the benefit of a particular application program of the application programs.

5. A data processing system according to claim 4, wherein:
the particular application program invokes a storage provisioning wizard to (1) gather information from a user regarding storage-related needs of the application program, and (2) utilize the gathered information in the determining of the need for the data storage resources.

6. A data processing system according to claim 1, wherein:
the storage allocation request message is an in-band message carried within a communications path between the one host computer and the data storage system that is also used for transferring storage request messages and corresponding storage data between the one host computer and the data storage system.

7. A data processing system according to claim 3, wherein:
the storage allocation request message is an out-of-band message carried separately from a communications path between the one host computer and the data storage system that is used for transferring storage request messages and corresponding storage data between the host computer and the data storage system.

8. A data processing system according to claim 1, wherein:
the one host computer is a master host computer of a cluster of host computers; and the storage-aware component is further operative to (1) receive indications from other host computers of the cluster of host computers regarding respective needs of the other host computers for data storage resources of respective sizes and classes, and (2) generate one or more additional storage allocation request messages representing respective requests by the one host computer that data storage resources of the respective sizes and classes be allocated to the cluster of host computers.

* * * * *